Jan. 19, 1937.　　　　J. F. TRITLE　　　　2,068,581
CIRCUIT CONTROLLER
Filed Dec. 11, 1935
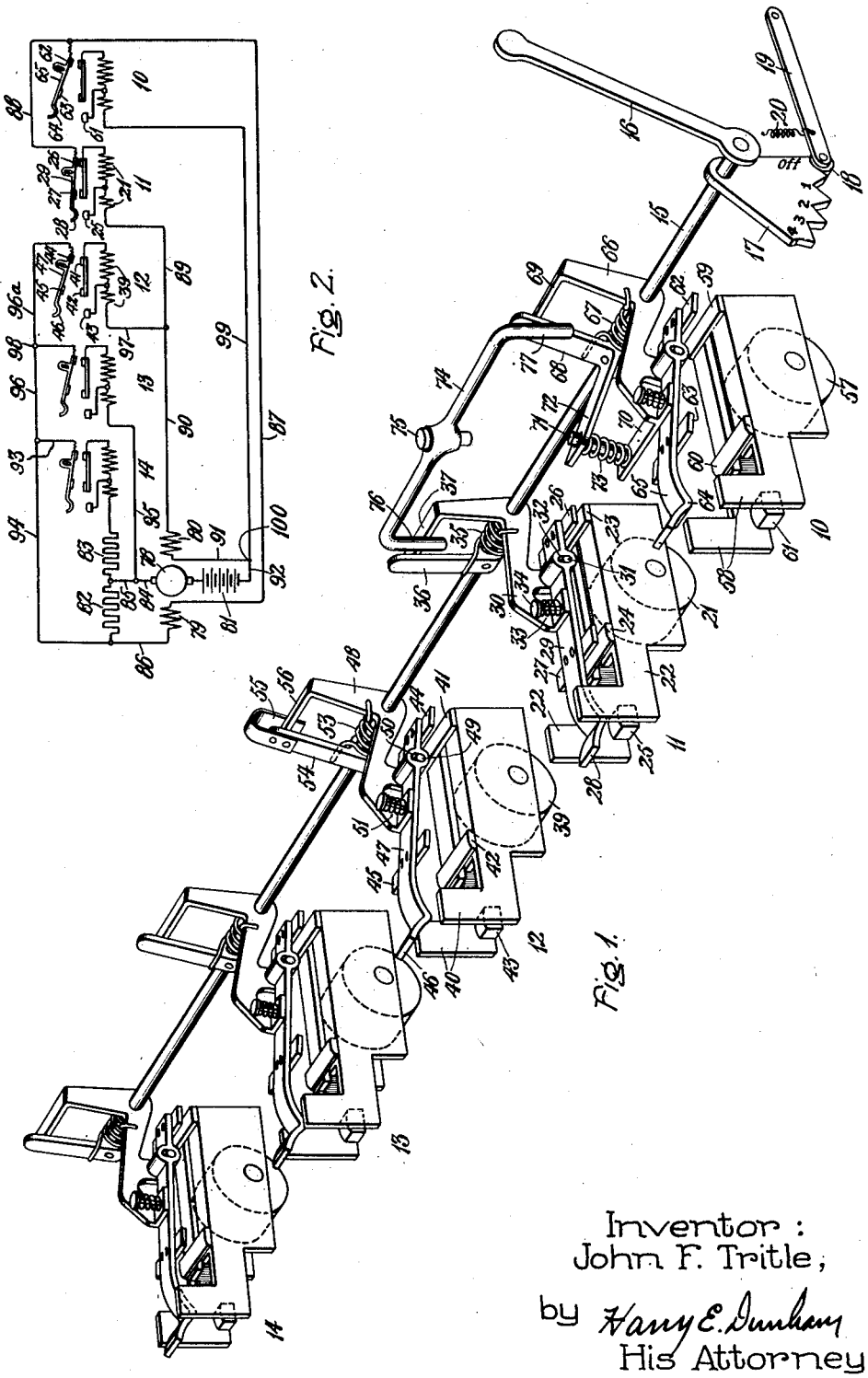
Inventor:
John F. Tritle,
by Harry E. Dunham
His Attorney.

Patented Jan. 19, 1937

2,068,581

UNITED STATES PATENT OFFICE 2,068,581

CIRCUIT CONTROLLER

John F. Tritle, Erie, Pa., assignor to General Electric Company, a corporation of New York Application December 11, 1935, Serial No. 53,934

7 Claims. (Cl. 175—375)

My invention relates to circuit controllers, more particularly to circuit controllers of the type adapted to control large values of current and which are provided with switch members operable between open and closed circuit positions with a snap action, and has for an object the provision of a simple, reliable, and inexpensive circuit controller of this type.

In my copending application, Serial No. 750,834, filed October 31, 1934, entitled "Circuit controller", which application is assigned to the same assignee as the present invention, I have described and claimed a circuit controller of the above type which is provided with resilient means for initially moving a switch member toward its closed circuit position and electromagnetic means responsive to this initial movement for operating the switch member to its closed circuit position with a snap action. The circuit controller described in my above referred to application is also provided with resilient means adapted to be stressed upon an initial movement of the switch member toward open circuit position and with means responsive to this initial movement for suddenly decreasing the energization of the electromagnet, whereupon the last-mentioned resilient means operates the switch member to the open circuit position with a snap action. Means are also disclosed in my above referred to application for operating a plurality of such circuit controllers between open and closed circuit positions in predetermined sequence.

While the circuit controller disclosed in my above referred to application is entirely suitable for controlling large values of current, I have found that in particular installations, a false operation of certain of the controller units in incorrect sequence may be obtained by an improper manipulation of the operating handle. For example, certain types of battery driven vehicles are provided with a single driving motor having a plurality of field windings. In order to accelerate the vehicle, the motor armature is first connected in series circuit relation with both of the field windings and a suitable current limiting resistance. Thereafter the current limiting resistance is cut out of the circuit in predetermined steps and finally the field windings of the motor are connected in parallel circuit relation with each other. When circuit controllers of the type disclosed in my above referred to application are applied to the control of a circuit of this type, it has been found that an improper manipulation of the controller handle may cause a false operation of the control units, so as to connect the motor armature in series circuit relation with only one of the field windings, whereby the speed of the vehicle is increased to an indesirably high value. Accordingly, it is a further object of my invention to provide interlocking means for a circuit controller of this type, which interlocking means prevents operation of the control units in improper sequence.

In carrying out my invention in one form, I provide a plurality of control units of the above type arranged to be operated by a common operating member. Upon movement of the operating member to its first position, one of the control units is operated to its closed circuit position with a snap action. Further movement of the operating member is effective to apply to another of the control units a biasing force tending to move the other control unit to its closed circuit position. Interlocking means are provided, however, between these two control units, which means prevent operation of the other control unit in accordance with its bias so long as the one control unit is in its closed circuit position. Upon a predetermined further movement of the operating handle, however, a third one of the control units is operated to its closed circuit position, and means are provided responsive to closure of the third control unit for releasing the one control unit, whereupon the bias on the other control unit becomes effective to operate the other control unit to its closed circuit position and to operate the one control unit to its open circuit position through the interlocking means. Movement of the operating handle in an opposite direction from its final position is effective to operate the other control unit and the third control unit to their respective open circuit positions, and the interlocking means thereupon is released to permit reclosure of the one control unit.

For a more complete understanding of my invention, reference should now be had to the drawing in which Fig. 1 is a somewhat diagrammatic perspective view of a circuit controller embodying my invention; and Fig. 2 is a circuit diagram illustrating the circuit connections by means of which the circuit controller shown in Fig. 1 controls the energization of a suitable electric motor.

Referring now to the drawing, I have shown my invention in one form as applied to a circuit controller comprising a plurality of independently operable control units 10, 11, 12, 13, and 14, respectively, which are arranged to be operated in predetermined sequence by an operating shaft 15 having an operating handle 16 and suitable positioning means comprising a toothed segment 17 which is secured to the shaft 15 and arranged to engage a roller 18 carried by a pivoted arm 19 and biased into engagement with the segment 17 by means of a spring 20. Any suitable means may be provided for insulating the control units from each other, but I prefer to form the shaft 15 of suitable insulating material. Each of the control units 11, 13, and 14 is identical with the control units described and claimed in my above referred to application, and accordingly, the control unit 11 only will be described in detail.

As shown, the control unit 11 comprises an operating electromagnet 21 which is arranged between a pair of magnetizable blow-out plates 22 arranged to support a pair of fixed contacts 23 and 24. A third fixed contact 25 is supported between the ends of the blow-out plates 22 in spaced relation thereto, and suitable co-operating movable contacts 26, 27, and 28 are provided on a movable switch member 29 for co-operation with the fixed contacts 23, 24, and 25, respectively. As shown, the switch member 29 is resiliently supported on an operating arm 30 by means of a lost-motion connection comprising a pin 31 and a slot 32 and by means of a spring 33 which surrounds a pin 34, the lower end of which extends through the operating arm 30 and is connected to the switch member 29. The operating arm 30 is loosely mounted on the operating shaft 15 for pivotal movement with respect thereto, and a coil spring 35 surrounding the operating shaft 15 is arranged with one end engaging the operating arm 30 and the other end engaging a stop member 36 rigidly secured to the shaft 15. Thus, the coil spring 35 serves to bias the operating arm 30 for movement toward the closed circuit position when the operating shaft is rotated in a counterclockwise direction. As shown, the operating arm 30 is provided with an extending finger 37 which is arranged to be engaged by the stop finger 36 positively to move the operating arm 30 toward open circuit position when the operating shaft 15 is rotated a predetermined amount in a clockwise direction.

The control unit 12 is identical in construction with the control unit 11 in so far as the arrangement of its operating electromagnet 39, its pole plates 40, its fixed contacts 41, 42, and 43, its movable contacts 44, 45, 46, and its switch member 47 is concerned. Likewise, the operating arm 48 is identical with the operating arm 30 of the control unit 11, and the switch member 47 is supported on the operating arm by means of an identical lost-motion connection comprising a pin 49 and a slot 50 and a spring 51. The operating arm 48 of this control unit, however, is normally biased to its open circuit position by a coil spring 53 which surrounds the shaft 15 with its respective ends engaging the operating arm 48 and a suitable stop member 54 carried by the shaft 15, the upper end of the stop member 54 being provided with a U-shaped leaf spring 55 arranged to engage a finger 56 extending from the operating arm 48 to determine the initial position of the operating arm 48 and the switch member 47.

Similarly, the control unit 10 is in some respects identical with the control unit 11, being provided with an operating electromagnet 57, blow-out plates 58, fixed contacts 59, 60, and 61, co-operating movable contacts 62, 63, and 64, and a bridging member 65 resiliently supported from an operating arm 66. As shown, however, this operating arm is normally biased to an open circuit position by a spring 67, one end of which engages a suitable stop member 68 carried by the shaft 15, and the operating arm 66 is provided with a pair of extending fingers 69 and 70, the finger 69 being arranged to engage the stop member 68 and the finger 70 carrying a post 71 which extends through a suitable aperture in a second stop member 72 carried by the shaft 15. Surrounding the post 71, is a coil spring 73, the opposite ends of which respectively engage the finger 70 and the stop member 72. This spring 73, in co-operation with the spring 67, determines the initial open circuit position of the operating arm 66 and the switch member 65.

Arranged to co-operate with the control units 10 and 11, I provide interlocking means comprising a lever 74 which is pivotally mounted intermediate its ends on a fixed pin 75 and provided with extending fingers 76 and 77, the finger 76 being arranged to engage the finger 37 on the operating arm 30 of the control unit 11, and the finger 77 being arranged to engage the extending finger 69 on the operating arm 66 of the control unit 10.

In Fig. 2, I have shown the circuit connections by means of which the circuit controller shown in Fig. 1 controls the connections of a driving motor. This driving motor comprises an armature 78 and a pair of field windings 79 and 80 arranged to be connected in energizing relation with a pair of current limiting resistors 82 and 83 and with a source of energy such, for example, as a battery 81. As shown, the control units 10 to 14, inclusive, are arranged on the operating shaft 15 to be closed and opened in predetermined sequence, the interlocking means preventing improper sequential operation of the control units 10 and 11 in a manner to be more fully described hereinafter. It is now believed that a complete understanding of my invention will be had from a description of the operation as a whole.

In the drawing, the circuit controller is shown in its off or open circuit position, and accordingly, the driving motor is de-energized. In order to initially energize the driving motor and to accelerate the vehicle (not shown) with which the driving motor is associated, the operating handle 15 is first moved in a counterclockwise direction from the off position to its first operating position in which the roller 18 engages the notch 1 of the positioning segment 17. Movement of the handle 16 and the consequent movement of the shaft 15 to this position is effective to stress the spring 35 of the control unit 11, so as to move the switch member 29 toward the closed circuit position. As is more fully described in my above referred to application, this initial movement of the switch member 29 is effective to engage the movable contact 27 with the fixed contact 24 and as shown in Fig. 2, closure of these contacts is effective to energize the operating winding 21, whereupon the switch member 29 is magnetically operated to its closed circuit position with a snap action, so as to engage the contact 26 with the contact 23. Consequent to the closure of these contacts, an energizing circuit is established for the driving motor which extends from the battery 81 through the armature 78, the conductors 84, 85, the resistance 82, the conductor 86, the field windings 79, the conductors 87 and 88 through the control unit 11 by way of the contacts 26 and 23 and the operating electromagnet 21, and by way of the conductors 89 and 90, the field winding 80 and the conductors 91 and 92 to the other side of the battery. It will thus be seen that the field windings 79 and 80 are connected in series circuit relation with each other and with the resistance 82, and accordingly, the driving motor begins slowly to accelerate.

In order further to accelerate the driving motor of the vehicle, the operating handle 16 of the controller is moved to its second position, as indicated by the reference numeral 2 on the positioning segment 17, and the consequent movement of the shaft 15 is effective to establish a circuit through the control unit 14, the operation of the control unit 14 to its closed circuit position being identical with the above described operation of the control unit 11. As shown in Fig. 2, closure of the control unit 14 is effective to connect the resistance 83 in parallel circuit relation with the resistance 82, thereby decreasing the effective resistance in circuit with the armature 78 and the field windings 79 and 80. This parallel circuit through the resistance 83 may be traced from the conductor 85 which is connected to one side of the resistance 82, through the resistance 83, the engaging contacts of the controller 14, and the conductors 93 and 94 to the conductor 86, which is connected to the other side of the resistance 82.

The vehicle now accelerates to a speed which is determined by the value of the resistance connected in the motor circuit and in order further to accelerate the vehicle, the operating handle 16 is moved to its third position, indicated by the reference numeral 3 on the positioning segment 17. This movement of the handle 16 rotates the shaft 15 so as to effect closure of the control unit 13 and, as shown in Fig. 2, closure of the control unit 13 is effective to short-circuit the resistances 82 and 83, so as to connect the field windings 79 and 80 directly in series circuit relation with each other and with the armature 78 and the battery 81. The energizing circuit of the motor may now be traced from the positive terminal of the battery through the armature 78, the conductors 84 and 95, the control unit 13, the conductors 96, 94, and 86, the field winding 79, the conductors 87 and 88, the control unit 11, the conductors 89 and 90, the field winding 80 and by way of the conductors 91 and 92 to the negative side of the battery.

In order further to accelerate the vehicle, it is now necessary to connect the field windings 79 and 80 in parallel circuit relation with each other by closing the control units 10 and 12 and opening the control unit 11. It will be apparent that as the operating shaft 15 has been moved through its first three positions, the stop finger 54 on the control unit 12 has been moved to urge the operating arm 48 of the control unit 12 toward its closed circuit position. Likewise, the stop members 68 and 72 of the control unit 10 have been moved to compress the spring 73 so as to bias the operating arm 66 and the switch member 65 of the control unit 10 towards the closed circuit position. Operation of the control unit 10 to the closed circuit position in accordance with its bias, however, is prevented by the interlocking lever 74, the finger 76 of which is engaged by the finger 37 of the control unit 11 when in the closed circuit position, so as to rotate the lever 74 about its pivot to a position in which the finger 77 engages the finger 69 of the operating unit 10.

Operation of the control unit 12 to its closed circuit position is not restrained by the interlocking lever, and accordingly, movement of the operating handle 16 to the fourth position, indicated by the reference numeral 4 on the positioning segment 17, is effective to operate the control unit 12 to its closed circuit position, the control unit 10 being restrained in its open circuit position by the interlocking lever 74.

As shown in Fig. 2, closure of the control unit 12 which is connected between the conductors 93 and 90 establishes a short circuit around the control unit 11 and the field winding 79, so as to produce a sudden decrease in the energization of the operating magnet 21 of the control unit 11. Momentarily, therefore, the energizing circuit for the motor extends from the positive side of the battery through the armature 78, the conductors 84 and 95, the control unit 13, the conductor 96a, the control unit 12, the conductors 97 and 90, the field winding 80 and by way of the conductors 91 and 92 to the negative side of the battery. It will be understood that the resistance of the field winding 79 and the operating coil 21 of the control unit 11 is several times greater than the resistance of the operating coil 39 of the control unit 12, and accordingly, only a very small current will flow through the electromagnet 21 immediately following the closure of the control unit 12.

As soon as the holding force exerted by the electromagnet 21 decreases, the bias exerted by the spring 73 of the control unit 10 becomes predominate and is effective to operate the control unit 10 to the closed circuit position and to rotate the interlocking lever 74 in a direction to operate the control unit 11 to its open circuit position.

Consequent to the closure of the control units 10 and 12 and the opening of the control unit 11, the field windings 79 and 80 are connected in parallel circuit relation with each other, and accordingly, the vehicle accelerates to its predetermined maximum speed. The energizing circuit of the motor may now be traced from the positive side of the battery 81 through the armature 78, the conductors 84 and 95 and by way of the control unit 13 to the junction point 98. At this junction point 98, the current divides, part of it flowing through the conductors 96, 94 and 86 to the field winding 79 and through the conductor 87, the control unit 10 and the conductor 99 to a junction point 100, the other part of the current flowing through the conductor 96a, the control unit 12, the conductors 97 and 90 to the field winding 80 and through the conductor 91 to the junction point 100. From the junction point 100, the combined current flows by way of the conductor 92 to the negative terminal of the battery.

It will be apparent that with the controller in its fourth position, the vehicle is operating at its maximum speed and if it is desired to decrease the speed of the vehicle it is necessary to open the control units 10 and 12 and to close the control unit 11, so as to reconnect the field windings 79 and 80 in series circuit relation with each other. This may be accomplished by rotating the operating handle 16 in a clockwise direction from the fourth position to the third position.

As the shaft 15 rotates in a clockwise direction in accordance with this movement of the handle 16, it will be apparent that the spring 53 of the control unit 12 will be stressed, and the stop member 54 will engage the finger 56 to rotate the operating member 48 in a clockwise direction. As fully described in my above referred to application, the magnetic force tending to hold the switch member 47 in its closed circuit position is greatest adjacent the contacts 45 and 42. Accordingly, as the operating member 48 rotates, the switch member 47 pivots about this pair of contacts, and the spring 51 is stressed by movement of the operating arm 48 relative to the switch member. Rotation of the switch member about the contacts 45 and 42 is effective to engage the contact 46 with the contact 43, and, as shown in Fig. 2, these contacts complete a short circuit about the major portion of the operating coil 39. Accordingly, the magnetic holding force exerted on the switch member 47 is suddenly decreased and the switch member is operated with a snap action to its open circuit position by the springs 51 and 53.

Similarly, the control unit 10 is operated to its open circuit position by rotation of the shaft 15 in a clockwise direction and it will be apparent that as the operating arm 66 of the control unit 10 moves in a clockwise direction, the interlocking lever 74 will be released for movement and the spring 35 of the control unit 11 will thereupon move the operating arm 30 and the switch member 29 toward closed circuit position. Inasmuch as movement of the control unit 12 to its open circuit position has removed the short circuit from around the operating electromagnet 21, the switch member 29 will be operated to its closed circuit position with a snap action in the manner hereinbefore described.

It will thus be apparent that as the operating handle 16 is moved between its third and fourth positions, the control units 10, 11, and 12 will be operated between their open and closed circuit positions in a predetermined sequence, the mechanical and electrical interlocking means preventing improper sequential operation of these units.

While I have shown a particular embodiment of my invention it will be understood of course that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A circuit controller system comprising an operating member, a plurality of switch members independently movable between open and closed circuit positions, means responsive to a predetermined movement of said operating member for operating one of said switch members to closed circuit position, means responsive to a predetermined further movement of said operating member for biasing another of said switch members toward its closed circuit position, interlocking means for preventing closure of said other switch member while said one switch member is in closed circuit position, means responsive to said further movement of said operating member for operating a third one of said switch members to closed circuit position, and means including said biasing means and said interlocking means for operating said one switch member to its open circuit position and said other switch member to its closed circuit position in response to closure of said third switch member.

2. A circuit controller system comprising an operating member sequentially movable to a plurality of positions, a plurality of switch members independently movable between open and closed circuit positions, means responsive to movement of said operating member to one position for operating one of said switch members to closed circuit position, means responsive to movement of said operating member to another position for biasing another switch member toward its closed circuit position, interlocking means for preventing closure of said other switch member while said one switch member is in closed circuit position, means responsive to said movement of said operating member to said other position for operating a third one of said switch members to closed circuit position, means including said biasing means and said interlocking means for operating said one switch member to its open circuit position and said other switch member to its closed circuit position in response to closure of said third switch member, means responsive to return movement of said operating member from said other position toward said one position for operating said other switch member and said third switch member to their respective open circuit positions, and means responsive to said operation of said switch members to said respective open circuit positions for operating said one switch member to its closed circuit position.

3. A circuit controller system comprising an operating member, a plurality of switch members independently movable between open and closed circuit positions, resilient means responsive to a predetermined movement of said operating member for operating one of said switch members towards closed circuit position, an operating electromagnet associated with said one switch member, means responsive to movement of said one switch member toward closed circuit position for energizing said electromagnet to operate said one switch member to closed circuit position with a snap action, means responsive to a predetermined further movement of said operating member for biasing another of said switch members toward closed circuit position, interlocking means for preventing closure of said other switch member while said one switch member is in closed circuit position, means responsive to said further movement of said operating member for operating a third one of said switch members to closed circuit position, and means responsive to closure of said third switch member for decreasing the energization of said electromagnet whereupon said biasing means operates said interlocking means to effect movement of said one switch member to its open circuit position and to permit closure of said other switch member.

4. A circuit controller system comprising an operating member sequentially movable to a plurality of positions, a plurality of switch members, resilient means responsive to movement of said operating member to said one position for operating one of said switch members toward closed circuit position, an operating electromagnet associated with said one switch member, means responsive to said operation of said switch member toward closed circuit position for energizing said electromagnet to operate said one switch member to closed circuit position with a snap action, means responsive to movement of said operating member to another position for biasing another of said switch members toward closed circuit position, interlocking means for preventing closure of said other switch member while said one switch member is in its closed circuit position, means responsive to said movement of said operating member to said other position for operating a third one of said switch members to its closed circuit position with a snap action, means responsive to closure of said third switch member for suddenly decreasing the energization of the operating electromagnet associated with said one switch member whereupon said biasing means and said interlocking means co-operate to effect movement of said one switch member to its open circuit position with a snap action against the force exerted by said resilient means and to effect movement of said other switch member to its closed circuit position with a snap action, means responsive to return movement of said operating member from said other position for operating said other switch member and said third switch member to their respective open circuit positions, and means including said electromagnet and said resilient means for operating said one switch member to its closed circuit position upon operation of said other switch member and said third switch member to said open circuit positions.

5. In a control system having a plurality of control devices each of which includes a switch member, resilient means for initially moving said switch member toward closed circuit position, and electromagnetic means energizable in response to said initial movement for operating said switch member to closed circuit position with a snap action, the combination of an operating member movable to a plurality of positions to stress said resilient means and thereby cause operation of said switch members to said closed circuit positions in predetermined sequence, interlocking means responsive to closure of one of said switch members for maintaining another of said switch members in open circuit position against the bias exerted by its associated resilient means, and means responsive to closure of a third one of said switch members for suddenly decreasing the energization of the electromagnet associated with said one switch member, whereupon the bias exerted on said other switch member is effective to close said other switch member and is effective through said interlocking means to open said one switch member.

6. In a control system having a plurality of control devices, each of which includes a switch member, resilient means for initially moving said switch member toward closed circuit position, and electromagnetic means energizable in response to said initial movement for operating said switch member to said closed circuit position with a snap action, the combination of an operating member movable to a plurality of positions sequentially to stress said resilient means and thereby cause sequential operation of said switch members to their respective closed circuit positions, an interlocking lever arranged to be moved from one position to a second position in response to operation of one of said switch members to closed circuit position, means including said interlocking lever in said second position for maintaining another of said switch members in its open position against the bias exerted by its stressed resilient means, means responsive to closure of a third one of said switch members for suddenly decreasing the energization of the electromagnet associated with said one switch member, the bias on said other switch member thereupon becoming effective to operate said interlocking lever to its first position and to close said other switch member, and means responsive to operation of said interlocking lever to said first position for operating said one switch member to its open circuit position against the force exerted by its associated resilient means.

7. In a control system having a plurality of control devices each of which includes a switch member, resilient means for initially moving said switch member toward closed circuit position, and electromagnetic means energizable in response to said initial movement for operating said switch member to closed circuit position with a snap action, the combination of an operating member movable to a plurality of positions to stress said resilient means and thereby cause operation of said switch members to said closed circuit positions in predetermined sequence, interlocking means responsive to closure of one of said switch members for maintaining another of said switch members in open circuit position against the bias exerted by its associated resilient means, means responsive to closure of a third one of said switch members for suddenly decreasing the energization of the electromagnet associated with said one switch member, whereupon the bias exerted on said other switch member effects closure of said other switch member and operates said interlocking means to open said one switch member against the force exerted by its resilient means, means responsive to movement of said operating member in an opposite direction for effecting opening movement of said other switch member and said third switch member to release said interlocking means and increase the energization of the electromagnet associated with said one switch member whereupon said one switch member automatically recloses.

JOHN F. TRITLE.